United States Patent
Hiratani

(10) Patent No.: US 6,725,298 B1
(45) Date of Patent: Apr. 20, 2004

(54) METHOD AND SYSTEM FOR FILTER-PROCESSING BY ENSURING A MEMORY SPACE FOR A RING-BUFFER IN DIGITAL SIGNAL PROCESSOR

(75) Inventor: Yutaka Hiratani, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 525 days.

(21) Appl. No.: 09/597,900

(22) Filed: Jun. 19, 2000

(30) Foreign Application Priority Data

Jun. 17, 1999 (JP) ............................. 11-171070

(51) Int. Cl.[7] .............................................. G06F 3/00
(52) U.S. Cl. ............................ 710/56; 710/52; 710/39; 710/9; 710/10; 711/3; 711/109; 711/219; 711/220; 711/110; 711/170; 711/202
(58) Field of Search ............................. 710/56, 52, 39, 710/9, 10; 711/3, 109, 219, 220, 110, 170, 202

(56) References Cited

U.S. PATENT DOCUMENTS

| | | | | |
|---|---|---|---|---|
| 5,373,493 A | * | 12/1994 | Iizuka | 369/124.14 |
| 5,787,497 A | | 7/1998 | Tokura et al. | |
| 5,913,229 A | * | 6/1999 | Joo | 711/200 |
| 6,044,434 A | * | 3/2000 | Oliver | 711/110 |
| 6,112,267 A | * | 8/2000 | McCormack et al. | 710/52 |
| 6,148,386 A | * | 11/2000 | Rhodes et al. | 711/200 |
| 6,404,776 B1 | * | 6/2002 | Voois et al. | 370/468 |

FOREIGN PATENT DOCUMENTS

| EP | 0 784 287 | 7/1997 |
|---|---|---|
| EP | 0 837 561 | 4/1998 |

OTHER PUBLICATIONS

Kenji Fujita, "In an Age in which DSP is more Competitive than CPU Performance," Nikkei bytes, Nikkei BP Company, 1994, pp. 108–115.

M. Inoue, Digital Signal Processing Programming; Interface, CQ Publication Co., 1997, pp. 223–236.

* cited by examiner

Primary Examiner—Jeffrey Gaffin
Assistant Examiner—Niketa Patel
(74) Attorney, Agent, or Firm—Young & Thompson

(57) ABSTRACT

A method of managing ring-buffer memory space in a digital signal processor when processing a filter, includes releasing ring-buffer memory space previously reserved for ring-buffer data upon completing a filter process and determining that the ring-buffer data stored in said ring-buffer memory space is no longer necessary after the filter-process is carried out.

9 Claims, 10 Drawing Sheets

101 : data memory space
102 : data bus
103 : ring-buffer
104 : top
105 : end
106 : data addressing unit
107 : data pointer register
108 : module register
109 : arithmetic and logic unit
110 : main bus 101 : data memory space
102 : data bus
103 : ring-buffer
104 : top
105 : end
106 : data addressing unit
107 : data pointer register
108 : module register
109 : arithmetic and logic unit
110 : main bus

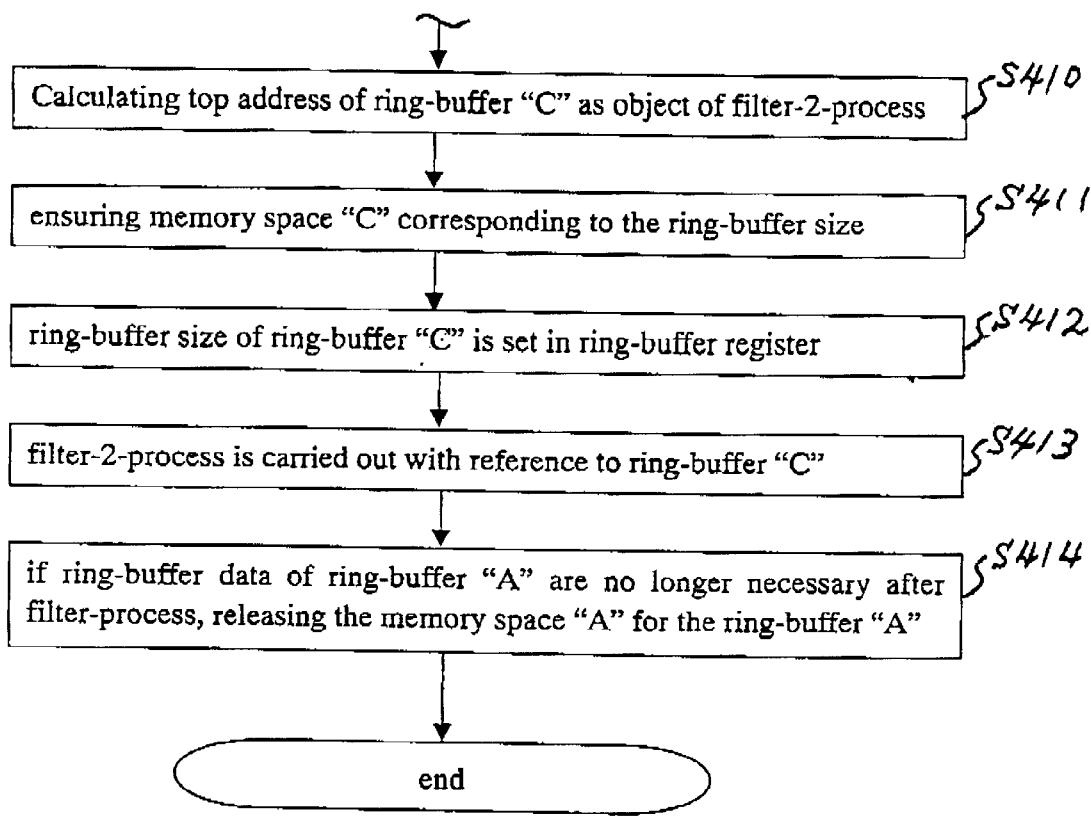

METHOD AND SYSTEM FOR FILTER-PROCESSING BY ENSURING A MEMORY SPACE FOR A RING-BUFFER IN DIGITAL SIGNAL PROCESSOR

BACKGROUND OF THE INVENTION

The present invention relates to a method and a system for filter-processing by ensuring a memory space for a ring-buffer.

As multi-media has been on the recent rapid growth, digital signal processors are frequently used for filter-processings in general with multiple functions. For example, a code excited linear prediction (CEL) processing as a voice compression processing is carried out by a prediction processing. For the purpose of the prediction processing, an encoder includes an algorithm of a decoder as a sub-set, for which reason a large number of filter-processings are commonly used. A plurality of size-different data tables are often referred in a single exclusive filter processing routine. As plural multimedia processings are performed on a real time operating system, it is necessary for efficiently using a limited memory resource to execute active operations of ensuring and releasing memory spaces during program operations.

The conventional filter processings will be described with reference to the drawing. FIG. 1 is a block diagram illustrative of a configuration of a data addressing unit and a data memory space used in a digital signal processor. FIG. 2 is a flow chart illustrative of a conventional operation of the filter processings. A data addressing unit 106 has a module register 108, a data pointer register 107 and an arithmetic and logic unit 109. The module register 108 is connected to a main bus 110. The data pointer register 107 is also connected to the main bus 110. The arithmetic and logic unit 109 is connected to the module register 108 and the data pointer register 107. The data pointer register 107 is also connected to a data memory space 101. The data memory space 101 has a ring-buffer 103 terminated with a top 104 and an end 105. The data memory space 101 is also connected to a data bus 102.

Operations of the filter processings will hereinafter be described with reference to FIG. 2.

In a first step S601, an address for the top 104 of the ring buffer 103 as the object of the filter-process is set in the data pointer register 107, wherein the address for the top 104 of the ring buffer 103 has low bits of zero in the bit number necessary for representing buffer size. In the prior art, the address of the top 104 of the ring-buffer 103 is not actively determined in the filter-processing. A fixed address is used which has been allocated by a designer for the filter-processing.

In a second step S203, a buffer size of the ring-buffer is set in the ring-buffer register 108.

In a third step S204, a filter-processing is carried out by sequential accesses to the ring-buffers 103. Even, during the filter-processing, a value of the data pointer register 107 for access to the ring-buffer 103 is subjected to an automatic adding operation for the address whereby the value of the data pointer register 107 is beyond the end 105 of the ring-buffer 103, then an adjustment to the address is always made by the ring buffer register 108 and the arithmetic and logic unit 109 in the data addressing unit 106 without an adjustment to the address by software.

FIG. 3 is a flow chart illustrative of a conventional process for two filters. FIG. 4 is a memory map illustrative of the conventional process for two filters of FIG. 3.

In a first step S701, as a top address of a first ring-buffer "A", a fixed address allocated by the filter designer is set.

In a second step S403, a buffer size of the first ring-buffer "A" is set in the ring buffer register.

In a third step S702, as a top address of a second ring-buffer "B", another fixed address allocated by the filter designer is set.

In a fourth step S406, a buffer size of the second ring-buffer "B" is set in the ring buffer register.

In a fifth step S407, a filer 1 is processed. A ring-buffer "C" is not used for the filter 1, and also parts 10–20 of the ring-buffer "A" are not used for the filter 1. Notwithstanding, the ring-buffer "C" and the parts 10–20 of the ring-buffer "A" are ensured for processing the filter 1. Accordingly, not only use memory spaces but also non-use memory spaces are ensured to correspond to the maximum value of the buffer. The non-use memory space is unavailable for the other processes than the process for the filter 1.

In a third step S703, as a top address of a third ring-buffer "C", another fixed address allocated by the filter designer is set.

In a fourth step S412, a buffer size of the third ring-buffer "C" is set in the ring buffer register.

In a fifth step S413, a filer 2 is processed. The ring-buffers "B" and "C" are not used for processing the filter 2. Notwithstanding, the ring-buffers "B" and "C" are ensured for processing the filter 1. Accordingly, not only use memory spaces but also non-use memory spaces are ensured to correspond to the maximum value of the buffer. The non-use memory space is unavailable for the other processes than the process for the filter 2.

Consequently, the conventional method and system have the following problems.

The first problem is a low efficiency in use of the memory spaces. In order to execute the filter-process to the plural ring-buffers different in size from each other, the memory space is ensured corresponding to the maximum size. This memory space will remain ensured even after the filter-process. The memory space once ensured for the one filter process will be unavailable for any other processes.

The second problem is a complicated memory management. In view of the architecture of the digital signal processor, the low bit of the address for the top of the ring buffer is zero in the bit number necessary for representing buffer size. The calculation of those addresses is made by the filter-designer for every ring-buffers so as to place the ring-buffers at fixed ring-buffer addresses.

In the above circumstances, it had been required to develop a novel method and a system for filter-processing by ensuring a memory space for a ring-buffer free from the above problem.

SUMMARY OF THE INVENTION

Accordingly, it is an object of the present invention to provide a novel method for filter-processing by ensuring a memory space for a ring-buffer free from the above problems.

It is a further object of the present invention to provide a novel system for filter-processing by ensuring a memory space for a ring-buffer. The first present invention provides a method of processing at least a filter by ensuring a ring-buffer memory space in a digital signal processor, wherein if ring-buffer data stored in the ring-buffer memory space becomes no longer necessary after a filter-process is carried out, the ring-buffer memory space is released.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1:
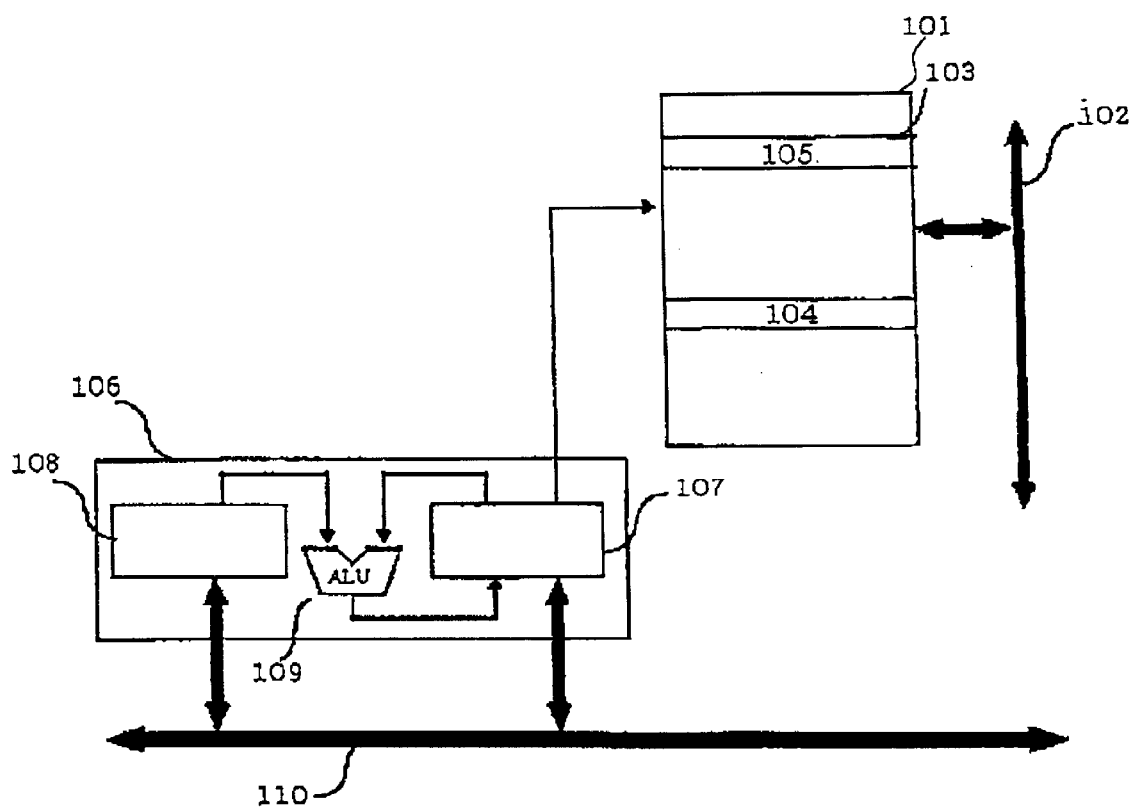
FIG. 1 is a block diagram illustrative of a configuration of a data addressing unit and a data memory space used in a digital signal processor.
Figure 2:
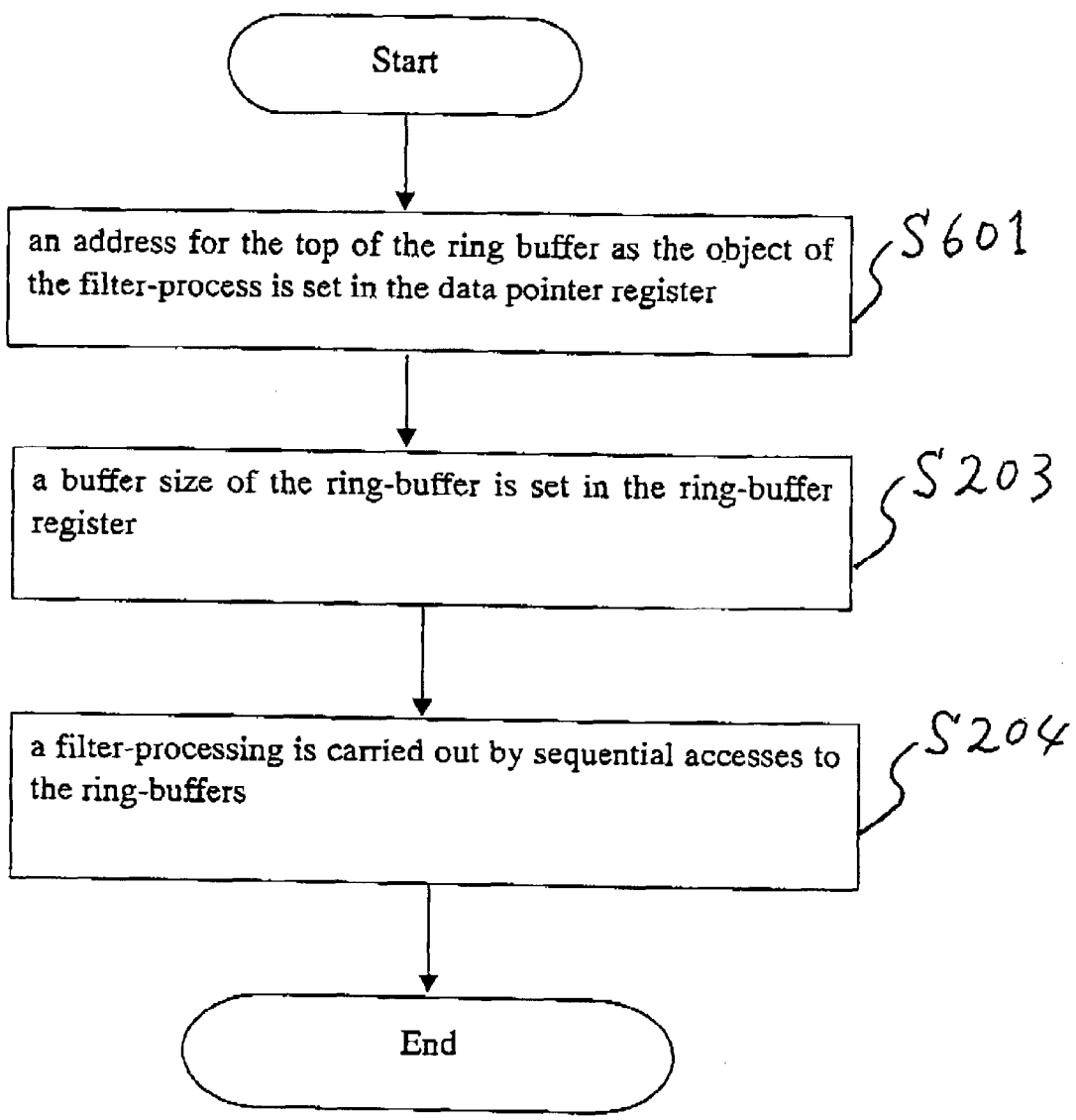
FIG. 2 is a flow chart illustrative of a conventional operation of the filter processings.
Figure 3:
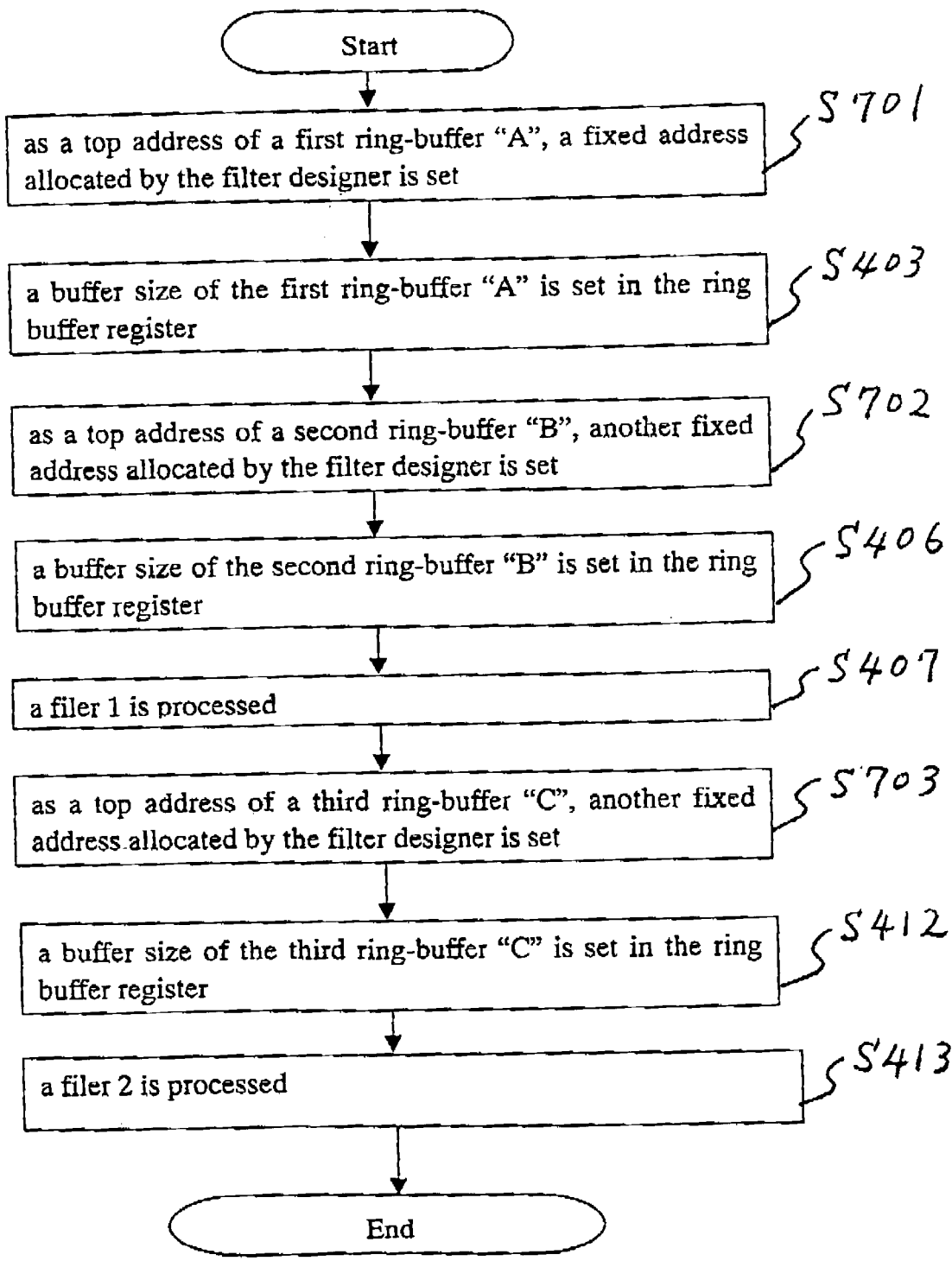
FIG. 3 is a flow chart illustrative of a conventional process for two filters.

The first present invention provides a method of processing at least a filter by ensuring a ring-buffer memory space in a digital signal processor, wherein if ring-buffer data stored in the ring-buffer memory space becomes no longer necessary after a filter-process is carried out, the ring-buffer memory space is released.

It is preferable that a single filter is processes, and the method comprises the steps of: setting a current address at a top of a data region in a ring-buffer memory space for placement of ring-buffer data to carry out an initialization; calculating a top address of a ring-buffer as an object for a filter-process to calculate a ring-buffer address; setting the calculated top address at the calculated ring-buffer address; ensuring a ring-buffer memory space corresponding to a ring-buffer size from the top address of the ring-buffer; setting the ring-buffer size in a ring-buffer register carrying out a filter-process; and releasing the ring-buffer memory space if the ring-buffer data becomes no longer necessary after the filter-process.

It is further preferable that the step of calculating the ring-buffer address comprises the steps of: carrying out a decrement to a buffer size of a ring-buffer as an object of a filter-process; executing calculation of a left shift number, where non-zero bit is MSB, on the basis of a value of the buffer size in accordance with a normalization instruction of a digital signal processor; subtracting the left shift number from a bit number corresponding to a register width in order to obtain a necessary bit number for representing the ring-buffer size; shifting a numerical "1" in a left direction by the necessary bit number for representing the ring-buffer size; subjecting the shifted value to a decrement so that bits corresponding to the necessary bit number from an LSB side are made into 1 to calculate mask data as mask values; masking a current address in a data memory space by the mask data; and confirming whether or not the masked address is 0, and if the masked address is 0, then the current address becomes a top address of the ring-buffer, for which the memory space is ensured, thereby calculating a top address of the ring-buffer as the object to the filter process, and if the masked address is not 0, then for the current address, bits corresponding to the above mask value become 0 and further the current address is added with a value obtained by increment to the mask value by the one-bit so that the added current address becomes a top address of the ring-buffer, for which the memory space is ensured, thereby calculating the top address of the ring-buffer as the object to the filter process.

It is also preferable that first and second filters are processed, and the method comprises the steps of: setting a current address at a top of a data region in a ring-buffer memory space for placement of ring-buffer data to carry out an initialization; calculating a first top address of a first ring-buffer as a first object for a first filter-process to calculate a first ring-buffer address; setting the calculated first top address at the calculated first ring-buffer address; ensuring a first ring-buffer memory space corresponding to first ring-buffer size from the first top address of the first ring-buffer; setting the first ring-buffer size in a first ring-buffer register; calculating a second top address of a second ring-buffer as the first object for the first filter-process to calculate a second ring-buffer address; setting the calculated second top address at the calculated second ring-buffer address; ensuring a second ring-buffer memory space corresponding to a second ring-buffer size from the second top address of the second ring-buffer; setting the second ring-buffer size in a second ring-buffer register; carrying out a first filter-process; and releasing the first and second ring-buffer memory spaces if the first and second ring-buffer data become no longer necessary after the first filter-process to renew a current address; calculating a third top address of a third ring-buffer as a second object for a second filter-process to calculate a third ring-buffer address; setting the calculated third top address at the calculated third ring-buffer address; ensuring a third ring-buffer memory space corresponding to a third ring-buffer size from the third top address of the third ring-buffer; setting the third ring-buffer size in a third ring-buffer register; carrying out a second filter-process; and releasing the third ring-buffer memory space if the third ring-buffer data become no longer necessary after the second filter-process to renew the current address, It is also preferable that each of the steps of calculating the first, second and third ring-buffer addresses comprises the steps of: carrying out a decrement to a buffer size of a ring-buffer as an object of a filter-process; executing calculation of a left shift number, where non-zero bit is MSB, on the basis of a value of the buffer size in accordance with a normalization instruction of a digital signal processor; subtracting the left shift number from a bit number corresponding to a register width in order to obtain a necessary bit number for representing the ring-buffer size; shifting a numerical "1" in a left direction by the necessary bit number for representing the ring-buffer size; subjecting the shifted value to a decrement so that bits corresponding to the necessary bit number from an LSB side are made into 1 to calculate mask data as mask values; masking a current address in a data memory space by the mask data; and confirming whether or not the masked address is 0, and if the masked address is 0, then the current address becomes a top address of the ring-buffer, for which the memory space is ensured, thereby calculating a top address of the ring-buffer as the object to the filter process, and if the masked address is not 0, then for the current address, bits corresponding to the above mask value become 0 and further the current address is added with a value obtained by increment to the mask value by the one-bit so that the added current address becomes a top address of the ring-buffer, for which the memory space is ensured, thereby calculating the top address of the ring-buffer as the object to the filter process.

The second present invention provides a system for processing at least a filter by ensuring a ring-buffer memory space in a digital signal processor, wherein the system has an element for releasing the ring-buffer memory space if ring-buffer data stored in the ring-buffer memory space becomes no longer necessary after a filter-process is carried out.

It is preferable that a single filter is processes by the system, and the system comprises: an element for setting a current address at a top of a data region in a ring-buffer memory space for placement of ring-buffer data to carry out an initialization; an element for calculating a top address of a ring-buffer as an object for a filter-process to calculate a ring-buffer address; an element for setting the calculated top address at the calculated ring-buffer address; an element for ensuring a ring-buffer memory space corresponding to a ring-buffer size from the top address of the ring-buffer; an element for setting the ring-buffer size in a ring-buffer register; an element for carrying out a filter-process; and an element for releasing the ring-buffer memory space if the ring-buffer data becomes no longer necessary after the filter-process.

It is further preferable that the element for calculating the ring-buffer address further comprises: an element for carrying out a decrement to a buffer size of a ring-buffer as an object of a filter-process; an element for executing calculation of a left shift number, where non-zero bit is MSB, on the basis of a value of the buffer size in accordance with a normalization instruction of a digital signal processor; an element for subtracting the left shift number from a bit number corresponding to a register width in order to obtain a necessary bit number for representing the ring-buffer size; an element for shifting a numerical "1" in a left direction by the necessary bit number for representing the ring-buffer size; an element for subjecting the shifted value to a decrement so that bits corresponding to the necessary bit number from an LSB side are made into 1 to calculate mask data as mask values; an element for masking a current address in a data memory space by the mask data; and an element for confirming whether or not the masked address is 0, and if the masked address is 0, then the current address becomes a top address of the ring-buffer, for which the memory space is ensured, thereby calculating a top address of the ring-buffer as the object to the filter process, and if the masked address is not 0, then for the current address, bits corresponding to the above mask value become 0 and further the current address is added with a value obtained by increment to the mask value by the one-bit so that the added current address becomes a top address of the ring-buffer, for which the memory space is ensured, thereby calculating the top address of the ring-buffer as the object to the filter process.

It is also preferable that first and second filters are processed by the system, and the system comprises: an element for setting a current address at a top of a data region in a ring-buffer memory space for placement of ring-buffer data to carry out an initialization; an element for calculating a first top address of a first ring-buffer as a first object for a first filter-process to calculate a first ring-buffer address; an element for setting the calculated first top address at the calculated first ring-buffer address; an element for ensuring a first ring-buffer memory space corresponding to a first ring-buffer size from the first top address of the first ring-buffer; an element for setting the first ring-buffer size in a first ring-buffer register; an element for calculating a second top address of a second ring-buffer as the first object for the first filter-process to calculate a second ring-buffer address; an element for setting the calculated second top address at the calculated second ring-buffer address; an element for ensuring a second ring-buffer memory space corresponding to a second ring-buffer size from the second top address of the second ring-buffer; an element for setting the second ring-buffer size in a second ring-buffer register; an element for carrying out a first filter-process; and an element for releasing the first and second ring-buffer memory spaces if the first and second ring-buffer data become no longer necessary after the first filter-process to renew a current address; an element for calculating a third top address of a third ring-buffer as a second object for a second filter-process to calculate a third ring-buffer address; an element for setting the calculated third top address at the calculated third ring-buffer address; an element for ensuring a third ring-buffer memory space corresponding to a third ring-buffer size from the third top address of the third ring-buffer; an element for setting the third ring-buffer size in a third ring-buffer register; an element for carrying out a second filter-process; and an element for releasing the third ring-buffer memory space if the third ring-buffer data become no longer necessary after the second filter-process to renew the current address.

It is further preferable that each of the elements for calculating the first, second and third ring-buffer addresses further comprises: an element for carrying out a decrement to a buffer size of a ring-buffer as an object of a filter-process; an element for executing calculation of a left shift number, where non-zero bit is MSB, on the basis of a value of the buffer size in accordance with a normalization instruction of a digital signal processor; an element for subtracting the left shift number from a bit number corresponding to a register width in order to obtain a necessary bit number for representing the ring-buffer size; an element for shifting a numerical "1" in a left direction by the necessary bit number for representing the ring-buffer size; an element for subjecting the shifted value to a decrement so that bits corresponding to the necessary bit number from an LSB side are made into 1 to calculate mask data as mask values; an element for masking a current address in a data memory space by the mask data; and an element for confirming whether or not the masked address is 0, and if the masked address is 0, then the current address becomes a top address of the ring-buffer, for which the memory space is ensured, thereby calculating a top address of the ring-buffer as the object to the filter process, and if the masked address is not 0, then for the current address, bits corresponding to the above mask value become 0 and further the current address is added with a value obtained by increment to the mask value by the one-bit so that the added current address becomes a top address of the ring-buffer, for which the memory space is ensured, thereby calculating the top address of the ring-buffer as the object to the filter process.

The third present invention provides a storage medium for storing a computer-readable program for processing at least a filter by ensuring a ring-buffer memory space in a digital signal processor, wherein the program releases the ring-buffer memory space if ring-buffer data stored in the ring-buffer memory space becomes no longer necessary after a filter-process is carried out.

It is preferable that a single filter is processes, and the program comprises the steps of: setting a current address at a top of a data region in a ring-buffer memory space for placement of ring-buffer data to carry out an initialization; calculating a top address of a ring-buffer as an object for a filter-process to calculate a ring-buffer address; setting the calculated top address at the calculated ring-buffer address; ensuring a ring-buffer memory space corresponding to a ring-buffer size from the top address of the ring-buffer; setting the ring-buffer size in a ring-buffer register; carrying out a filter-process; and releasing the ring-buffer memory space if the ring-buffer data becomes no longer necessary after the filter-process.

It is further preferable that the step of calculating the ring-buffer address comprises the steps of; carrying out a decrement to a buffer size of a ring-buffer as an object of a filter-process; executing calculation of a left shift number, where non-zero bit is MSB, on the basis of a value of the buffer size in accordance with a normalization instruction of a digital signal processor; subtracting the left shift number from a bit number corresponding to a register width in order to obtain a necessary bit number for representing the ring-buffer size; shifting a numerical "1" in a left direction by the necessary bit number for representing the ring-buffer size; subjecting the shifted value to a decrement so that bits corresponding to the necessary bit number from an LSB side are made into 1 to calculate mask data as mask values; masking a current address in a data memory space by the mask data; and confirming whether or not the masked address is 0, and if the masked address is 0, then the current address becomes a top address of the ring-buffer, for which the memory space is ensured, thereby calculating a top address of the ring-buffer as the object to the filter process, and if the masked address is not 0, then for the current address, bits corresponding to the above mask value become 0 and further the current address is added with a value obtained by increment to the mask value by the one-bit so that the added current address becomes a top address of the ring-buffer, for which the memory space is ensured, thereby calculating the top address of the ring-buffer as the object to the filter process.

It is also preferable that first and second filters are processed, and the program comprises the steps of: setting a current address at a top of a data region in a ring-buffer memory space for placement of ring-buffer data to carry out an initialization; calculating a first top address of a first ring-buffer as a first object for a first filter-process to calculate a first ring-buffer address; setting the calculated first top address at the calculated first ring-buffer address; ensuring a first ring-buffer memory space corresponding to a first ring-buffer size from the first top address of the first ring-buffer; setting the first ring-buffer size in a first ring-buffer register; calculating a second top address of a second ring-buffer as the first object for the first filter-process to calculate a second ring-buffer address; setting the calculated second top address at the calculated second ring-buffer address; ensuring a second ring-buffer memory space corresponding to a second ring-buffer size from the second top address of the second ring-buffer setting the second ring-buffer size in a second ring-buffer register; carrying out a first filter-process; and releasing the first and second ring-buffer memory spaces if the first and second ring-buffer data become no longer necessary after the first filter-process to renew a current address; calculating a third top address of a third ring-buffer as a second object for a second filter-process to calculate a third ring-buffer address; setting the calculated third top address at the calculated third ring-buffer address; ensuring a third ring-buffer memory space corresponding to a third ring-buffer size from the third top address of the third ring-buffer; setting the third ring-buffer size in a third ring-buffer register; carrying out a second filter-process; and releasing the third ring-buffer memory space if the third ring-buffer data become no longer necessary after the second filter-process to renew the current address.

It is further preferable that each of the steps of calculating the first, second and third ring-buffer addresses comprises the steps of: carrying out a decrement to a buffer size of a ring-buffer as an object of a filter-process; executing calculation of a left shift number, where non-zero bit is MSB, on the basis of a value of the buffer size in accordance with a normalization instruction of a digital signal processor; subtracting the left shift number from a bit number corresponding to a register width in order to obtain a necessary bit number for representing the ring-buffer size; shifting a numerical "1" in a left direction by the necessary bit number for representing the ring-buffer size; subjecting the shifted value to a decrement so that bits corresponding to the necessary bit number from an LSB side are made into 1 to calculate mask data as mask values; masking a current address in a data memory space by the mask data; and confirming whether or not the masked address is 0, and if the masked address is 0, then the current address becomes a top address of the ring-buffer, for which the memory space is ensured, thereby calculating a top address of the ring-buffer as the object to the filter process, and if the masked address is not 0, then for the current address, bits corresponding to the above mask value become 0 and further the current address is added with a value obtained by increment to the mask value by the one-bit so that the added current address becomes a top address of the ring-buffer, for which the memory space is ensured, thereby calculating the top address of the ring-buffer as the object to the filter process.

PREFERRED EMBODIMENT

Figure 5:
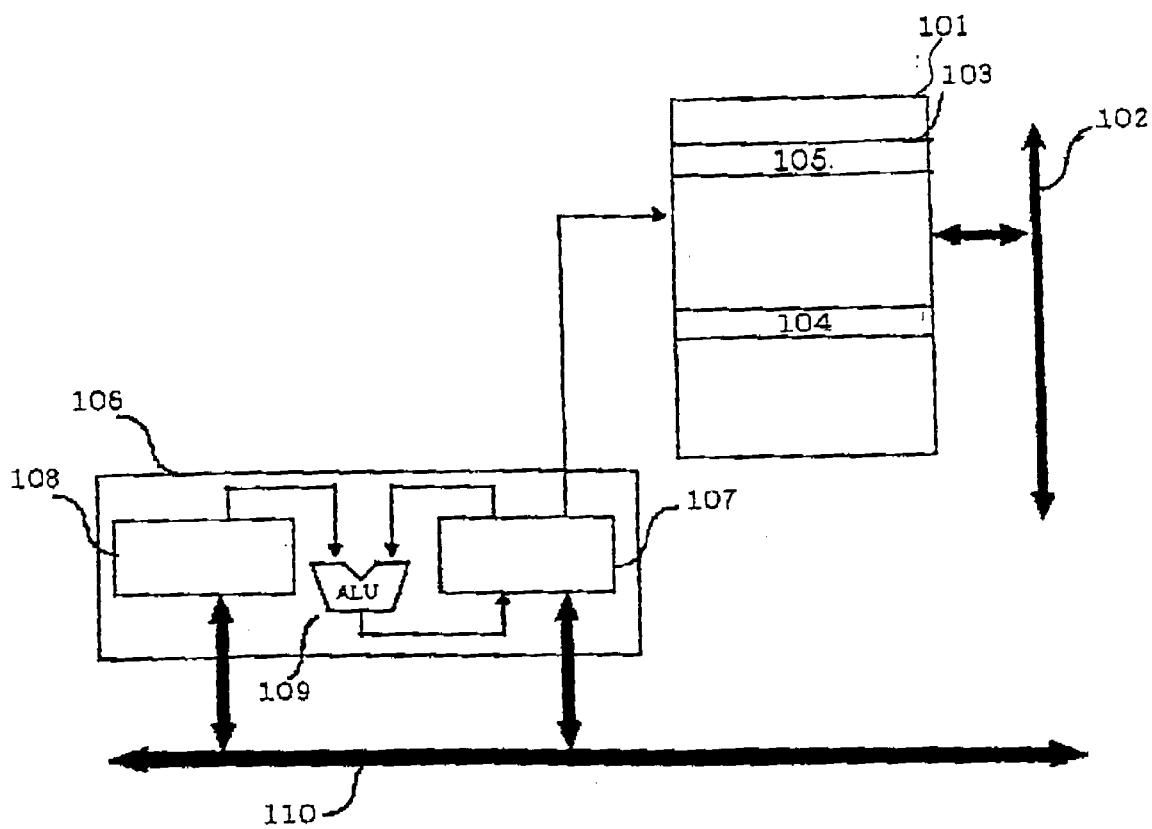
FIG. 5 is a block diagram illustrative of a configuration of a data addressing unit and a data memory space used in a digital signal processor in a novel filter-processes in a first embodiment in accordance with the present invention.

A first embodiment according to the present invention will be described in detail with reference to the drawings. FIG. 5 is a block diagram illustrative of a configuration of a data addressing unit and a data memory space used in a digital signal processor in a novel filter-processes in a first embodiment in accordance with the present invention. A data memory space 101 is connected to a data bus 102 independent from a main bus 101 for the purpose of parallel processings for operations and data access. The data memory space 101 has a ring-buffer 103 terminated with a top 104 and an end 105. A data addressing unit 106 has a module register 108, a data pointer register 107 and an arithmetic and logic unit 109. The data pointer register 107 is also connected to the data memory space 101, so that the data pointer register 107 serves as an exclusive register for the data access to the data memory space 101. The arithmetic and logic unit 109 is connected to the data pointer register 107, so that after the data access, then a value of the data pointer register 107 is sent to the arithmetic and logic unit 109, so that the value is automatically subjected to an automatic address add operation by the arithmetic and logic unit 109. The module register 108 is connected to a main bus 110. The data pointer register 107 is also connected to the main bus 110. The arithmetic and logic unit 109 is connected to the module register 108. The module register 108 stores ring buffer sizes of the ring buffers. The arithmetic and logic unit 109 compares the added value with a value of the module register 108. If the added value exceeds the value of the module register 108, then the value of the data pointer register 107 is returned to the top 104 of the ring-buffer 103, provided that a hardware restriction makes it necessary that the address of the top 104 of the ring-buffer 103 is zero in low bit number necessary for representing the buffer size by the module register 108. For example, if the ring-buffer size is 8 words, the necessary bit number for representation is 5 bits, for which reason five lower bits of the address of the top 104 of the ring-buffer 103 is zero. It is impossible that the buffer size is zero, for which reason zero is considered to be buffer size 1. In this case, the necessary bit number for representing the buffer size 8 is 4 bits.

Figure 6:
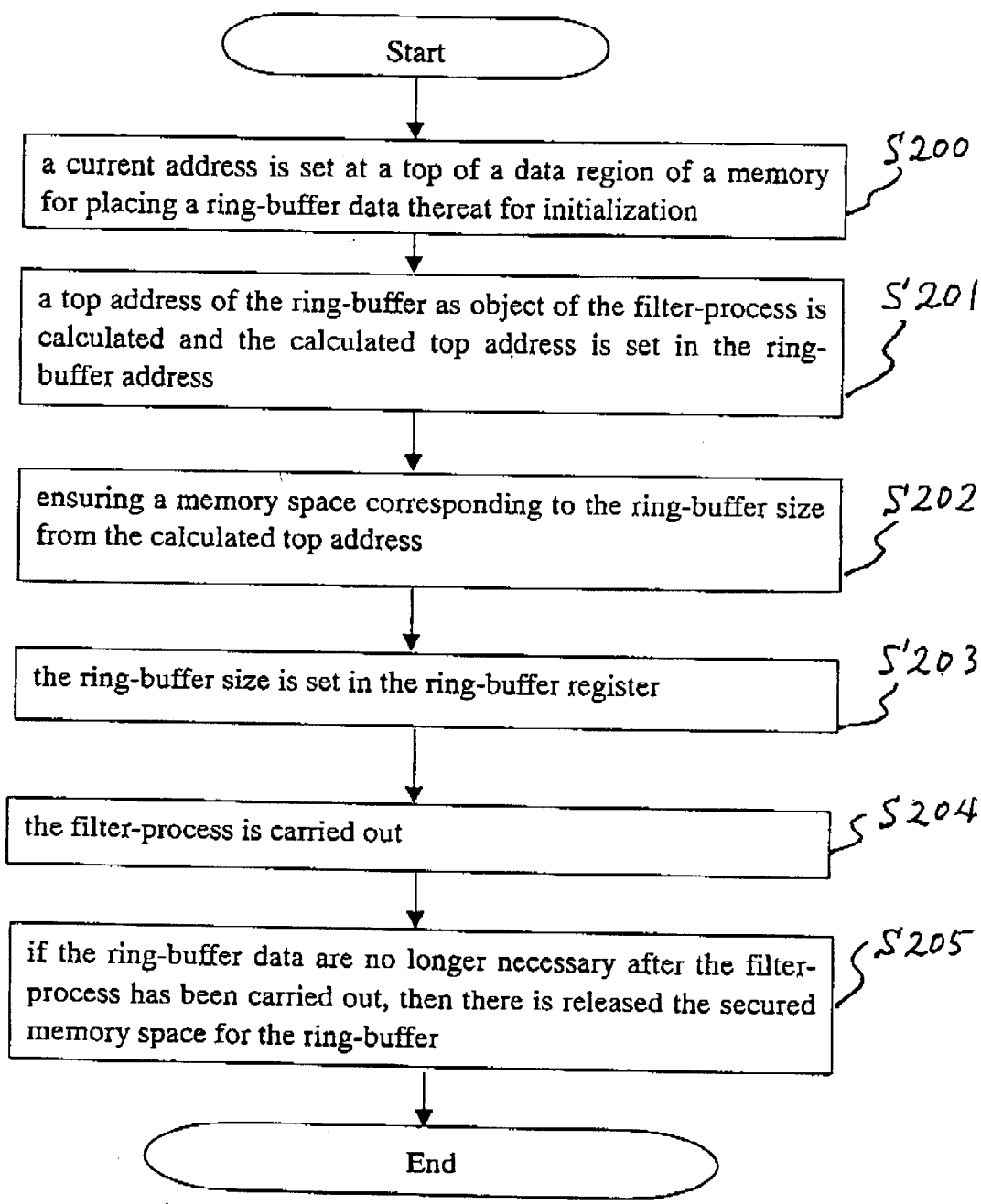
FIG. 6 is a flow chart illustrative of a novel operation of the filter processings, wherein a single filter uses a single ring-buffer, in a first embodiment in accordance with the present invention.
Figure 7:
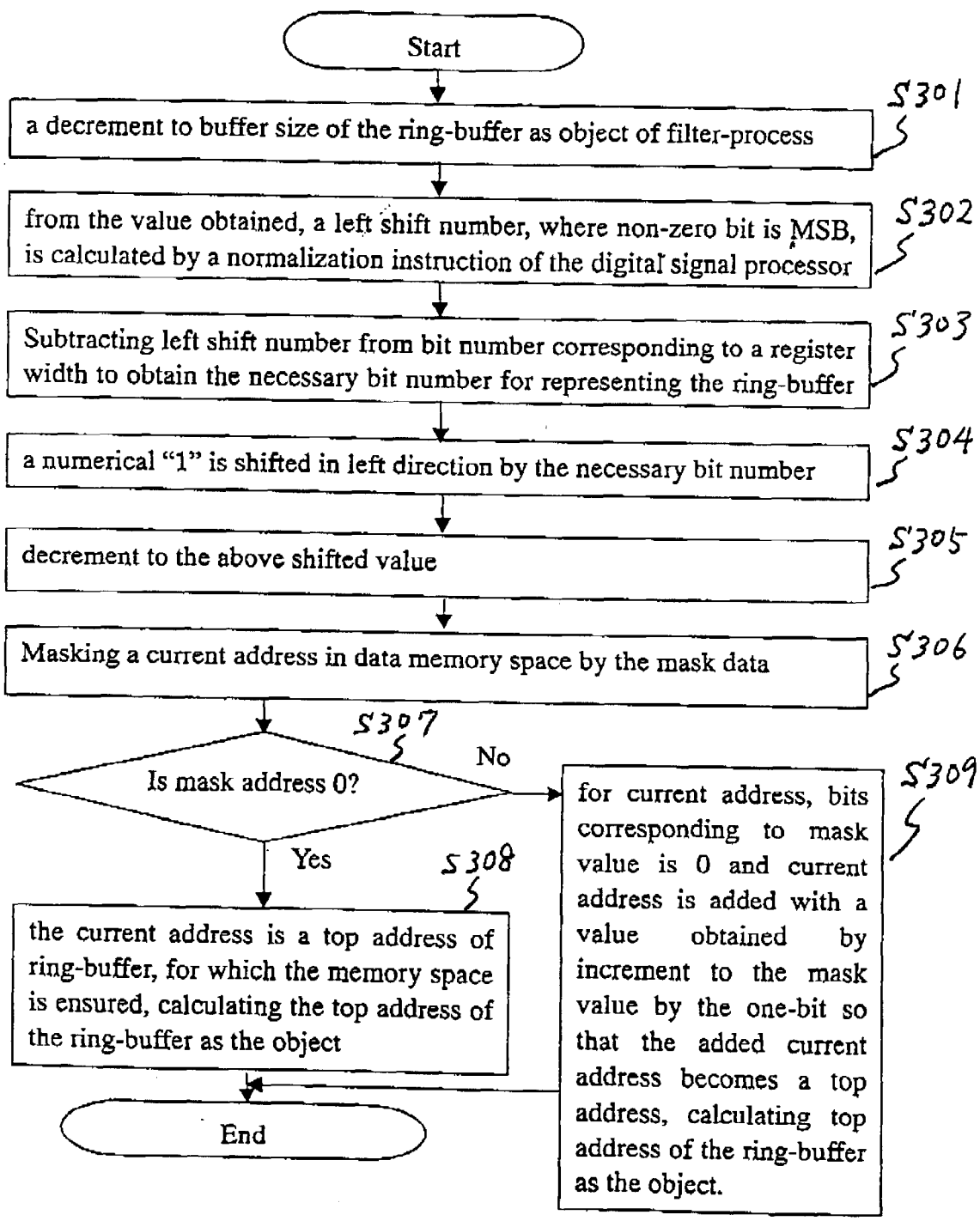
FIG. 7 is a flow chart illustrative of a novel operation of calculation of a ring-buffer address involved in the filter processings of FIG. 6.

Operations of the filter processes for processing a single filter will hereinafter be described with reference to FIGS. 6 and 7. FIG. 6 is a flow chart illustrative of a novel operation of the filter processings, wherein a single filter uses a single ring-buffer, in a first embodiment in accordance with the present invention. FIG. 7 is a flow chart illustrative of a novel operation of calculation of a ring-buffer address involved in the filter processings of FIG. 6.

In a step S200, a current address is set at a top of a data region of a memory for placing a ring-buffer data thereat for initialization.

In a step S201, a top address of the ring-buffer as an object of the filter-process is calculated in the following processes shown in FIG. 7.

In a step S301, a decrement is made to the buffer size of the ring-buffer as the object of the filter-process.

In a step S302, on the basis of the value obtained above, a left shift number, where non-zero bit is MSB, is calculated by a normalization instruction of the digital signal processor.

In a step S303, the above calculated left shift number is subtracted from the bit number corresponding to a register width in order to obtain the necessary bit number for representing the ring-buffer size.

In a step S304, a numerical "1" is shifted in left direction by the necessary bit number for representing the ring-buffer size.

In a step S305, the above shifted value is subjected to the decrement so that bits corresponding to the above necessary bit number from the LSB side are made into 1 to calculate a mask data as a mask value.

In a step S306, a current address in the data memory space is masked by the above mask data.

In a step S307, it is confirmed whether or not the masked address is 0. If the masked address is 0, then the process will enter into a step S308. If the masked address is not 0, then the process will enter into a step S309.

In a step S308, since the masked address is 0, then the above current address becomes a top address of the ring-buffer, for which the memory space is ensured, thereby calculating the top address of the ring-buffer as the object to the filter process.

In a step S309, since the masked address is not 0, then for the current address, bits corresponding to the above mask value become 0 and further the current address is added with a value obtained by increment to the mask value by the one-bit so that the added current address becomes a top address of the ring-buffer, for which the memory space is ensured, thereby calculating the top address of the ring-buffer as the object to the filter process.

In the step S201, the calculated top address is set in the ring-buffer address.

In the step S202, there is ensured a memory space corresponding to the ring-buffer size from the calculated top address.

In the step S203, the ring-buffer size is set in the ring-buffer register.

In the step S204, the filter-process is carried out.

In the step S205, if the ring-buffer data are no longer necessary after the filter-process has been carried out, then there is released the secured memory space for the ring-buffer.

Figure 8:
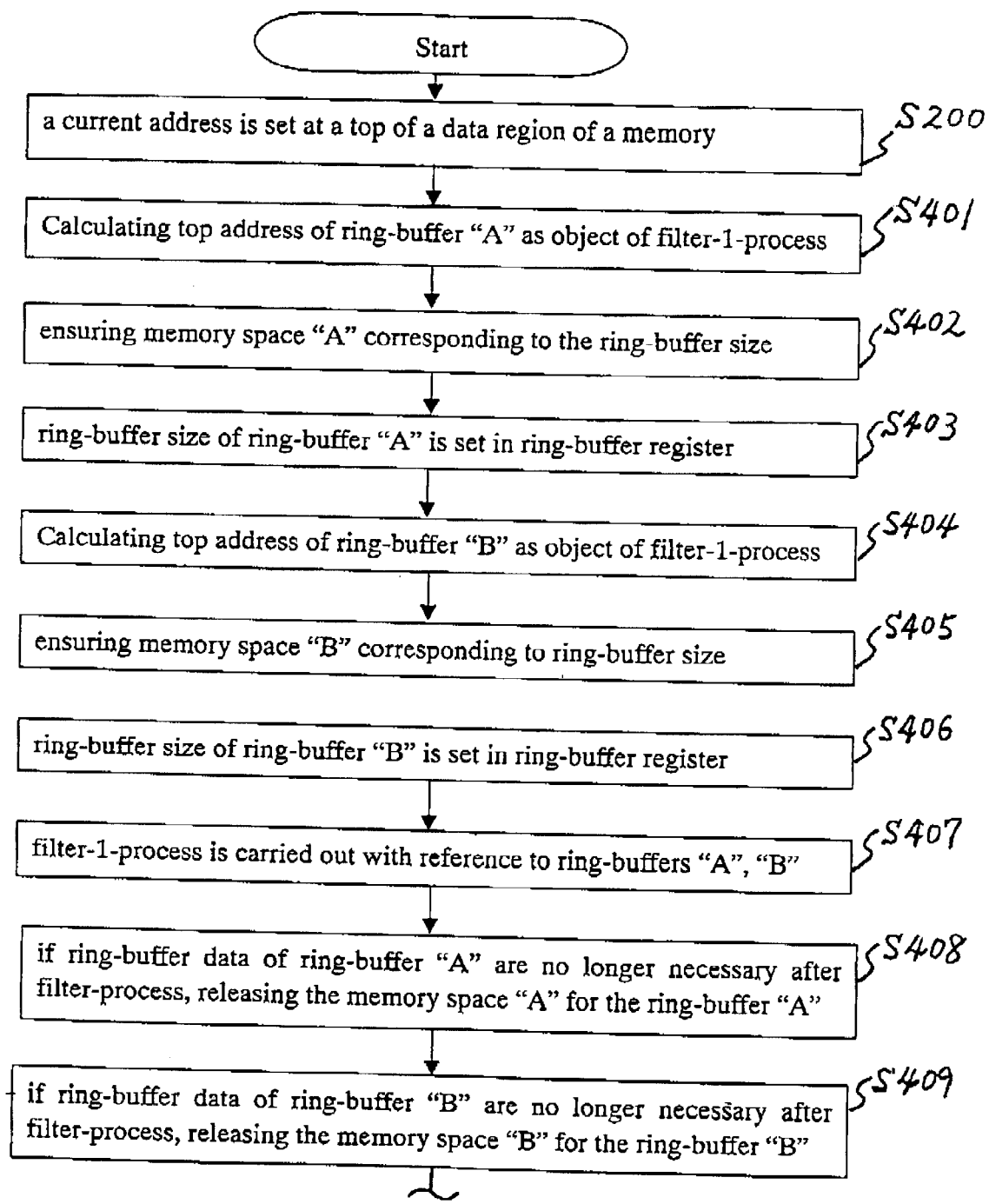
FIG. 8 is a flow chart illustrative of a novel operation of the filter processings, wherein two filter use two ring-buffers in accordance with the present invention.
Figure 9:
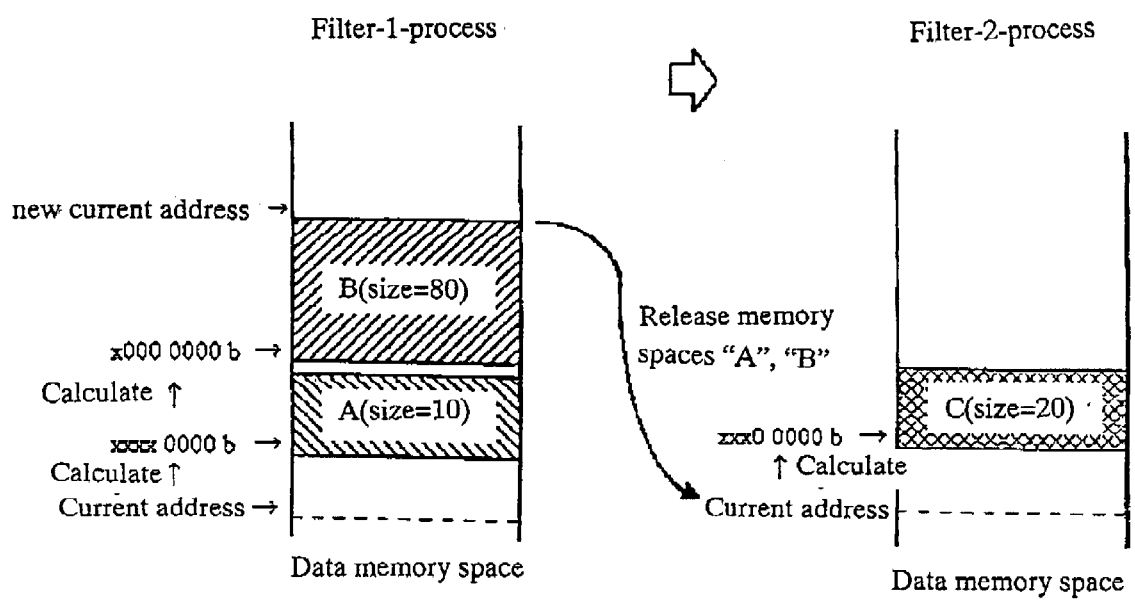
FIG. 9 is a memory map illustrative of the novel process for two filters of FIG. 8.

In the above process for ensuring the memory space, the top address to be ensured is added with the size to be ensured in order to renew the current address for the next cycle, whilst non-renewed current address is stored. In the above process for releasing the memory space, the stored non-renewed current address is utilized to be renewed into the top of the memory space to be released. It is also possible to Store the buffer size in place of the current address, Operations of the filter processes for processing two filters will hereinafter be described with reference to FIGS. 8 and 9. FIG. 8 is a flow chart illustrative of a novel operation of the filter processings, wherein two filter use two ring-buffers in accordance with the present invention. FIG. 9 is a memory map illustrative of the novel process for two filters of FIG. 8.

The following descriptions will be made under the following conditions. In the filter 1, the ring-buffers "A" and "B" are processed. The ring-buffer "A" varies in the range of size from 10 to 20. In the followings, the size is assumed to be 10. The ring-buffer "B" varies in the range of size from 40 to 80. In the followings, the size is assumed to be 80, In the filter 2, the ring-buffer "C" and "B" is processed. The size is assumed to be 20.

In a step S200, a current address is set at a top of a data region of a memory for placing a ring-buffer data thereat for initialization.

In a step S401, a top address of the ring-buffer "A" as an object of the filter-1-process is calculated in the following processes shown in FIG. 7.

In a step S301, a decrement is made to the buffer size of the ring-buffer "A" as the object of the filter-1-process.

In a step S302, on the basis of the value obtained above, a left shift number, where non-zero bit is MSB, is calculated by a normalization instruction of the digital signal processor.

In a step S303, the above calculated left shift number is subtracted from the bit number corresponding to a register width in order to obtain the necessary bit number for representing the first ring-buffer size of the ring-buffer "A".

In a step S304, a numerical "1" is shifted in left direction by the necessary bit number for representing the first ring-buffer size of the ring-buffer "A".

In a step S305, the above shifted value is subjected to the decrement so that bits corresponding to the above necessary bit number from the LSB side are made into 1 to calculate a mask data as a mask value.

In a step S306, a current address in the data memory space is masked by the above mask data.

In a step S307, it is confirmed whether or not the masked address is 0. If the masked address is 0, then the process will enter into a step S308. If the masked address is not 0, then the process will enter into a step S309.

In a step S308, since the masked address is 0, then the above current address becomes a top address of the ring-buffer, for which the memory space "A" is ensured, thereby calculating the top address of the ring-buffer "A" as the object to the filter process.

In a step S309, since the masked address is not 0, then for the current address, bits corresponding to the above mask value become 0 and further the current address is added with a value obtained by increment to the mask value by the one-bit so that the added current address becomes a top address of the ring-buffer "A", for which the memory space "A" is ensured, thereby calculating the top address of the ring-buffer "A" as the object to the filter process.

In the step S401, the calculated top address of the ring-buffer "A" is set in the ring-buffer address.

In the step S402, there is ensured a memory space "A" corresponding to the ring-buffer size from the calculated top address of the ring-buffer "A". The current address is set in the next to the ring-buffer size.

In the step S403, the ring-buffer size of the ring-buffer "A" is set in the ring-buffer register.

In a step S404, a top address of the ring-buffer "B" as an object of the filter-1-process is calculated in the following processes shown in FIG. 7.

In a step S301, a decrement is made to the buffer size of the ring-buffer "B" as the object of the filter-1-process.

In a step S302, on the basis of the value obtained above, a left shift number, where non-zero bit is MSB, is calculated by a normalization instruction of the digital signal processor.

In a step S303, the above calculated left shift number is subtracted from the bit number corresponding to a register width in order to obtain the necessary bit number for representing the second ring-buffer size of the ring-buffer "B".

In a step S304, a numerical "1" is shifted in left direction by the necessary bit number for representing the second ring-buffer size of the ring-buffer "B".

In a step S305, the above shifted value is subjected to the decrement so that bits corresponding to the above necessary bit number from the LSB side are made into 1 to calculate a mask data as a mask value.

In a step S306, a current address in the data memory space is masked by the above mask data.

In a step S307, it is confirmed whether or not the masked address is 0. If the masked address is 0, then the process will enter into a step S308. If the masked address is not 0, then the process will enter into a step S309.

In a step S308, since the masked address is 0, then the above current address becomes a top address of the ring-buffer, for which the memory space "B" is ensured, thereby calculating the top address of the ring-buffer "B" as the object to the filter process.

In a step S309, since the masked address is not 0, then for the current address, bits corresponding to the above mask value become 0 and further the current address is added with a value obtained by increment to the mask value by the one-bit so that the added current address becomes a top address of the ring-buffer "B", for which the memory space "B" is ensured, thereby calculating the top address of the ring-buffer "B" as the object to the filter process, In the step S404, the calculated top address of the ring-buffer "B" is set in the ring-buffer address.

In the step S405, there is ensured a memory space "B" corresponding to the ring-buffer size from the calculated top address of the ring-buffer "B". The current address is set in the next to the ring-buffer size.

In the step S406, the ring-buffer size of the ring-buffer "B" is set in the ring-buffer register.

In the step S407, the filter-1-process for processing the filter 1 is carried out with reference to the ring-buffers "A" and "B".

In the step S408, if the ring-buffer data of the ring-buffer "A" are no longer necessary after the filter-process has been carried out, then there is released the secured memory space "A" for the ring-buffer "A".

In the step S409, if the ring-buffer data of the ring-buffer "B" are no longer necessary after the filter-process has been carried out, then there is released the secured memory space "B" for the ring-buffer "B".

In a step S410, a top address of the ring-buffer "C" as an object of the filter-2-process is calculated in the following processes shown in FIG. 7.

In a step S301, a decrement is made to the buffer size of the ring-buffer "C" as the object of the filter-2-process.

In a step S302, on the basis of the value obtained above, a left shift number, where non-zero bit is MSB, is calculated by a normalization instruction of the digital signal processor.

In a step S303, the above calculated left shift number is subtracted from the bit number corresponding to a register width in order to obtain the necessary bit number for representing the third ring-buffer size of the ring-buffer "C".

In a step S304, a numerical "1" is shifted in left direction by the necessary bit number for representing the third ring-buffer size of the ring-buffer "C".

In a step S305, the above shifted value is subjected to the decrement so that bits corresponding to the above necessary bit number from the LSB side are made into 1 to calculate a mask data as a mask value.

In a step S306, a current address in the data memory space is masked by the above mask data.

In a step S307, it is confirmed whether or not the masked address is 0. If the masked address is 0, then the process will enter into a step S308. If the masked address is not 0, then the process will enter into a step S309, In a step S308, since the masked address is 0, then the above current address becomes a top address of the ring-buffer, for which the memory space "C" is ensured, thereby calculating the top address of the ring-buffer "C" as the object to the filter process.

In a step S309, since the masked address is not 0, then for the current address, bits corresponding to the above mask value become 0 and further the current address is added with a value obtained by increment to the mask value by the one-bit so that the added current address becomes a top address of the ring-buffer "C", for which the memory space "C" is ensured, thereby calculating the top address of the ring-buffer "C" as the object to the filter process.

In the step S410, the calculated top address of the ring-buffer "C" is set in the ring-buffer address.

In the step S411, there is ensured a memory space "C" corresponding to the ring-buffer size from the calculated top address of the ring-buffer "C". The current address is set in the next to the ring-buffer size.

In the step S412, the ring-buffer size of the ring-buffer "C" is set in the ring-buffer register.

In the step S413, the filter-2-process for processing the filter 2 is carried out with reference to the ring-buffer "C".

In the step S414, if the ring-buffer data of the ring-buffer "C" are no longer necessary after the filter-process has been carried out, then there is released the secured memory space "C" for the ring-buffer "C".

The top address of the ring-buffer is calculated to actively ensure and release the memory space to prevent ensuring the unnecessary memory space, thereby improving the efficiency in use of the memory space.

The above present invention provides the following effects.

The first effect is to improve the memory efficiency.

In the prior art, the memory space corresponding to the maximum value of the ring-buffer is fixedly ensured even after the ensured memory space has become no longer necessary, In accordance with the present invention, however, after the ensured memory space becomes unnecessary, the unnecessary memory space is released so that substantially no buffer region in non-use is present.

Figure 4:
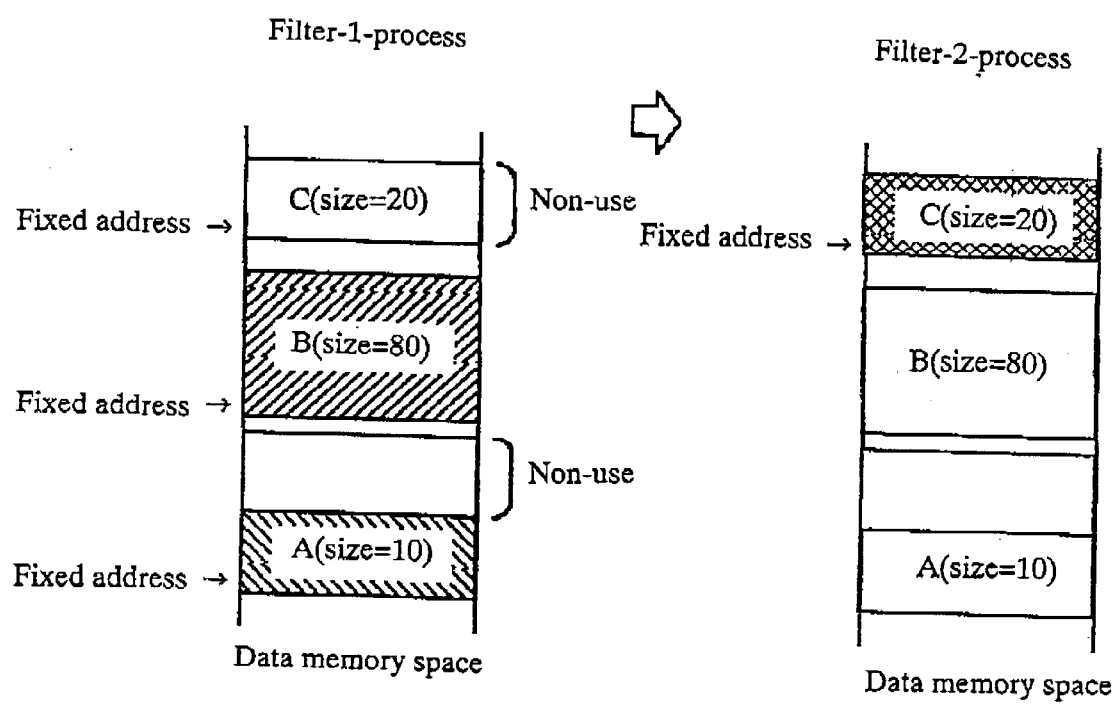
FIG. 4 is a memory map illustrative of the conventional process for two filters of FIG. 3.

With reference to FIGS. 4 and 9 processing the two filters, the size in the prior art is as follows.

Memory "A" (20)+memory "B" (80)+memory "C" (20)= 120 By contrast, in accordance with the present invention, the size is as follows.

Memory "A" (10)+memory "B" (80)=90 Namely, the present invention provides 25% reduction in the used size.

The above comparison is simple example. If a large number of the ring-buffers are used and variation in size of the ring-buffers is large, then the effect of the present invention for reducing the ring-buffer size is more remarkable.

The second effect of the present invention is to allow shortening the necessary time period for development to the filter-process program. The calculation of the address of the ring-buffer and ensuring the memory space are made by the programs. The filter-designer is allowed to design the filter processes without considering the memory layout of the ring-buffer. Further, it is allowed that the data for the ring-buffers and other data co-exist in the single data region, whereby making it convenience for the memory management.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of processing at least a filter by ensuring a ring-buffer memory space in a digital signal processor, comprising the step of:

releasing a ring-buffer memory space previously reserved for ring-buffer data upon completing a filter-process and determining that the ring-buffer data stored in said ring-buffer memory space is no longer necessary after the filter-process is carried out, wherein a single filter is a process, and said method comprises the steps of:

setting a current address at a top of a data region in a ring-buffer memory space for placement of ring-buffer data to carry out an initialization;

calculating a top address of a ring-buffer as an object for a filter-process to calculate a ring-buffer address;

setting said calculated top address at said calculated ring-buffer address;

ensuring a ring-buffer memory space corresponding to a ring-buffer size from said top address of said ring-buffer;

setting said ring-buffer size in a ring-buffer register;

carrying out a filter-process; and releasing said ring-buffer memory space if said ring-buffer data becomes no longer necessary after said filter-process, and wherein said step of calculating said ring-buffer address comprises the steps of:

carrying out a decrement to a buffer size of a ring-buffer as an object of a filter-process;

executing calculation of a left shift number, where non-zero bit is MSB, on the basis of a value of said buffer size in accordance with a normalization instruction of a digital signal processor;

subtracting said left shift number from a bit number corresponding to a register width in order to obtain a necessary bit number for representing said ring-buffer size;

shifting a numerical "1" in a left direction by said necessary bit number for representing said ring-buffer size;

subjecting said shifted value to a decrement so that bits corresponding to said necessary bit number from an LSB side are made into 1 to calculate mask data as mask values;

masking a current address in a data memory space by said mask data; and confirming whether or not said masked address is 0, and if said masked address is 0, then said current address becomes a top address of said ring-buffer, for which said memory space is ensured, thereby calculating a top address of said ring-buffer as said object to said filter process, and if said masked address is not 0, then for said current address, bits corresponding to the above mask value become 0 and further said current address is added with a value obtained by increment to said mask value by the one-bit so that said added current address becomes a top address of said ring-buffer, for which said memory space is ensured, thereby calculating said top address of said ring-buffer as said object to said filter process.

2. A method of processing at least a filter by ensuring a ring-buffer memory space in a digital signal processor, comprising the step of:

releasing a ring-buffer memory space previously reserved for ring-buffer data upon completing a filter-process and determining that the ring-buffer data stored in said ring-buffer memory space is no longer necessary after the filter-process is carried out, wherein first and second filters are processed, and said method comprises the steps of:

setting a current address at a top of a data region in a ring-buffer memory space for placement of ring-buffer data to carry out an initialization;

calculating a first top address of a first ring-buffer as a first object for a first filter-process to calculate a first ring-buffer address;

setting said calculated first top address at said calculated first ring-buffer address;

ensuring a first ring-buffer memory space corresponding to a first ring-buffer size from said first top address of said first ring-buffer;

setting said first ring-buffer size in a first ring-buffer register;

calculating a second top address of a second ring-buffer as said first object for said first filter-process to calculate a second ring-buffer address;

setting said calculated second top address at said calculated second ring-buffer address;

ensuring a second ring-buffer memory space corresponding to a second ring-buffer size from said second top address of said second ring-buffer;

setting said second ring-buffer size in a second ring-buffer register;

carrying out a first filter-process; and releasing said first and second ring-buffer memory spaces if said first and second ring-buffer data become no longer necessary after said first filter-process to renew a current address;

calculating a third top address of a third ring-buffer as a second object for a second filter-process to calculate a third ring-buffer address;

setting said calculated third top address at said calculated third ring-buffer address;

ensuring a third ring-buffer memory space corresponding to a third ring-buffer size from said third top address of said third ring-buffer;

setting said third ring-buffer size in a third ring-buffer register;

carrying out a second filter-process; and releasing said third ring-buffer memory space if said third ring-buffer data become no longer necessary after said second filter-process to renew the current address.

3. The method as claimed in claim 2, wherein each of said steps of calculating said first, second and third ring-buffer addresses comprises the steps of:

carrying out a decrement to a buffer size of a ring-buffer as an object of a filter-process;

executing calculation of a left shift number, where non-zero bit is MSB, on the basis of a value of said buffer size in accordance with a normalization instruction of a digital signal processor;

subtracting said left shift number from a bit number corresponding to a register width in order to obtain a necessary bit number for representing said ring-buffer size;

shifting a numerical "1" in a left direction by said necessary bit number for representing said ring-buffer size;

subjecting said shifted value to a decrement so that bits corresponding to said necessary bit number from an LSB side are made into 1 to calculate mask data as mask values;

masking a current address in a data memory space by said mask data; and confirming whether or not said masked address is 0, and if said masked address is 0, then said current address becomes a top address of said ring-buffer, for which said memory space is ensured, thereby calculating a top address of said ring-buffer as said object to said filter process, and if said masked address is not 0, then for said current address, bits corresponding to the above mask value become 0 and further said current address is added with a value obtained by increment to said mask value by the one-bit so that said added current address becomes a top address of said ring-buffer, for which said memory space is ensured, thereby calculating said top address of said ring-buffer as said object to said filter process.

4. A system for processing at least a filter by ensuring a ring-buffer memory space in a digital signal processor, wherein the system comprises:

means for releasing a ring-buffer memory space previously reserved for ring-buffer data upon completing a filter-process and determining that the ring-buffer data stored in said ring-buffer memory space is no longer necessary after the filter-process is carried out, wherein a single filter is a process by said system, and said system comprises:

means for setting a current address at a top of a data region in a ring-buffer memory space for placement of ring-buffer data to carry out an initialization;

means for calculating a top address of a ring-buffer as an object for a filter-process to calculate a ring-buffer address;

means for setting said calculated top address at said calculated ring-buffer address;

means for ensuring a ring-buffer memory space corresponding to a ring-buffer size from said top address of said ring-buffer;

means for setting said ring-buffer size in a ring-buffer register;

means for carrying out a filter-process; and means for releasing said ring-buffer memory space if said ring-buffer data becomes no longer necessary after said filter-process, wherein said means for calculating said ring-buffer address further comprises:

means for carrying out a decrement to a buffer size of a ring-buffer as an object of a filter-process;

means for executing calculation of a left shift number, where non-zero bit is MSB, on the basis of a value of said buffer size in accordance with a normalization instruction of a digital signal processor;

means for subtracting said left shift number from a bit number corresponding to a register width in order to obtain a necessary bit number for representing said ring-buffer size;

means for shifting a numerical "1" in a left direction by said necessary bit number for representing said ring-buffer size;

means for subjecting said shifted value to a decrement so that bits corresponding to said necessary bit number from an LSB side are made into 1 to calculate mask data as mask values;

means for masking a current address in a data memory space by said mask data; and means for confirming whether or not said masked address is 0, and if said masked address is 0, then said current address becomes a top address of said ring-buffer, for which said memory space is ensured, thereby calculating a top address of said ring-buffer as said object to said filter process, and if said masked address is not 0, then for said current address, bits corresponding to the above mask value become 0 and further said current address is added with a value obtained by increment to said mask value by the one-bit so that said added current address becomes a top address of said ring-buffer, for which said memory space is ensured, thereby calculating said top address of said ring-buffer as said object to said filter process.

5. A system for processing at least a filter by ensuring a ring-buffer memory space in a digital signal processor, wherein the system comprises:

means for releasing a ring-buffer memory space previously reserved for ring-buffer data upon completing a filter-process and determining that the ring-buffer data stored in said ring-buffer memory space is no longer necessary after the filter-process is carried out, wherein first and second filters are processed by said system, and said system comprises:

means for setting a current address at a top of a data region in a ring-buffer memory space for placement of ring-buffer data to carry out an initialization;

means for calculating a first top address of a first ring-buffer as a first object for a first filter-process to calculate a first ring-buffer address;

means for setting said calculated first top address at said calculated first ring-buffer address;

means for ensuring a first ring-buffer memory space corresponding to a first ring-buffer size from said first top address of said first ring-buffer;

means for setting said first ring-buffer size in a first ring-buffer register;

means for calculating a second top address of a second ring-buffer as said first object for said first filter process to calculate a second ring-buffer address;

means for setting said calculated second top address at said calculated second ring-buffer address;

means for ensuring a second ring-buffer memory space corresponding to a second ring-buffer size from said second top address of said second ring-buffer;

means for setting said second ring-buffer size in a second ring-buffer register;

means for carrying out a first filter-process; and means for releasing said first and second ring-buffer memory spaces if said first and second ring-buffer data become no longer necessary after said first filter-process to renew a current address;

means for calculating a third top address of a third ring-buffer as a second object for a second filter-process to calculate a third ring-buffer address;

means for setting said calculated third top address at said calculated third ring-buffer address;

means for ensuring a third ring-buffer memory space corresponding to a third ring-buffer size from said third top address of said third ring-buffer;

means for setting said third ring-buffer size in a third ring-buffer register;

means for carrying out a second filter-process; and means for releasing said third ring-buffer memory space if said third ring-buffer data become no longer necessary after said second filter-process to renew the current address.

6. The system as claimed in claim 5, wherein each of said means for calculating said first, second and third ring-buffer addresses further comprises:

means for carrying out a decrement to a buffer size of a ring-buffer as an object of a filter-process;

means for executing calculation of a left shift number, where non-zero bit is MSB, on the basis of a value of said buffer size in accordance with a normalization instruction of a digital signal processor;

means for subtracting said left shift number from a bit number corresponding to a register width in order to obtain a necessary bit number for representing said ring-buffer size;

means for shifting a numerical "1" in a left direction by said necessary bit number for representing said ring-buffer size;

means for subjecting said shifted value to a decrement so that bits corresponding to said necessary bit number from an LSB side are made into 1 to calculate mask data as mask values;

means for masking a current address in a data memory space by said mask data; and means for confirming whether or not said masked address is 0, and if said masked address is 0, then said current address becomes a top address of said ring-buffer, for which said memory space is ensured, thereby calculating a top address of said ring-buffer as said object to said filter process, and if said masked address is not 0, then for said current address, bits corresponding to the above mask value become 0 and further said current address is added with a value obtained by increment to said mask value by the one-bit so that said added current address becomes a top address of said ring-buffer, for which said memory space is ensured, thereby calculating said top address of said ring-buffer as said object to said filter process.

7. A storage medium for storing a computer-readable program for processing at least a filter by ensuring a ring-buffer memory space in a digital signal processor, wherein said program releases a ring-buffer memory space previously reserved for ring-buffer data upon completing a filter-process and determining that the ring-buffer data stored in said ring-buffer memory space is no longer necessary after the filter-process is carried out, wherein a single filter is a process, and said program comprises the steps of:

setting a current address at a top of a data region in a ring-buffer memory space for placement of ring-buffer data to carry out an initialization;

calculating a top address of a ring-buffer as an object for a filter-process to calculate a ring-buffer address;

setting said calculated top address at said calculated ring-buffer address;

ensuring a ring-buffer memory space corresponding to a ring-buffer size from said top address of said ring-buffer;

setting said ring-buffer size in a ring-buffer register;

carrying out a filter-process; and releasing said ring-buffer memory space if said ring-buffer data becomes no longer necessary after said filter-process, wherein said step of calculating said ring-buffer address comprises the steps of:

carrying out a decrement to a buffer size of a ring-buffer as an object of a filter-process;

executing calculation of a left shift number, where non-zero bit is MSB, on the basis of a value of said buffer size in accordance with a normalization instruction of a digital signal processor;

subtracting said left shift number from a bit number corresponding to a register width in order to obtain a necessary bit number for representing said ring-buffer size;

shifting a numerical "1" in a left direction by said necessary bit number for representing said ring-buffer size;

subjecting said shifted value to a decrement so that bits corresponding to said necessary bit number from an LSB side are made into 1 to calculate mask data as mask values;

masking a current address in a data memory space by said mask data; and confirming whether or not said masked address is 0, and if said masked address is 0, then said current address becomes a top address of said ring-buffer, for which said memory space is ensured, thereby calculating a top address of said ring-buffer as said object to said filter process, and if said masked address is not 0, then for said current address, bits corresponding to the above mask value become 0 and further said current address is added with a value obtained by increment to said mask value by the one-bit so that said added current address becomes a top address of said ring-buffer, for which said memory space is ensured, thereby calculating said top address of said ring-buffer as said object to said filter process.

8. A storage medium for storing a computer-readable program for processing at least a filter by ensuring a ring-buffer memory space in a digital signal processor, wherein said program releases a ring-buffer memory space previously reserved for ring-buffer data upon completing a filter-process and determining that the ring-buffer data stored in said ring-buffer memory space is no longer necessary after the filter-process is carried out, wherein first and second filters are processed, and said program comprises the steps of:
setting a current address of a top of a data region in a ring-buffer memory space for placement of ring-buffer data to carry out an initialization;
calculating a first top address of a first ring-buffer as a first object for a first filter-process to calculate a first ring-buffer address;
setting said calculated first top address at said calculated first ring-buffer address;
ensuring a first ring-buffer memory space corresponding to a first ring-buffer size from said first top address of said first ring-buffer;
setting said first ring-buffer size in a first ring-buffer register;
calculating a second top address of a second ring-buffer as said first object for said first filter-process to calculate a second ring-buffer address;
setting said calculated second top address at said calculated second ring-buffer address;
ensuring a second ring-buffer memory space corresponding to a second ring-buffer size from said second top address of said second ring-buffer;
setting said second ring-buffer size in a second ring-buffer register;
carrying out a first filter-process; and
releasing said first and second ring-buffer memory spaces if said first and second ring-buffer data become no longer necessary after said first filter-process to renew a current address;
calculating a third top address of a third ring-buffer as a second object for a second filter-process to calculate a third ring-buffer address;
setting said calculated third top address at said calculated third ring-buffer address;
ensuring a third ring-buffer memory space corresponding to a third ring-buffer size from said third top address of said third ring-buffer;
setting said third ring-buffer size in a third ring-buffer register;
carrying out a second filter-process; and
releasing said third ring-buffer memory space if said third ring-buffer data become no longer necessary after said second filter-process to renew the current addresses.

9. The storage medium as claimed in claim 8, wherein each of said steps of calculating said first, second and third ring-buffer addresses comprises the steps of:
carrying out a decrement to a buffer size of a ring-buffer as an object of a filter-process;
executing calculation of a left shift number, where non-zero bit is MSB, on the basis of a value of said buffer size in accordance with a normalization instruction of a digital signal processor;
subtracting said left shift number from a bit number corresponding to a register width in order to obtain a necessary bit number for representing said ring-buffer size;
shifting a numerical "1" in a left direction by said necessary bit number for representing said ring-buffer size;
subjecting said shifted value to a decrement so that bits corresponding to said necessary bit number from an LSB side are made into 1 to calculate mask data as mask values;
masking a current address in a data memory space by said mask data; and
confirming whether or not said masked address is 0, and if said masked address is 0, then said current address becomes a top address of said ring-buffer, for which said memory space is ensured, thereby calculating a top address of said ring-buffer as said object to said filter process, and if said masked address is not 0, then for said current address, bits corresponding to the above mask value become 0 and further said current address is added with a value obtained by increment to said mask value by the one-bit so that said added current address becomes a top address of said ring-buffer, for which said memory space is ensured, thereby calculating said top address of said ring-buffer as said object to said filter process.

* * * * *